United States Patent [19]

Bladow et al.

[11] B 4,008,337

[45] Feb. 15, 1977

[54] METHOD OF INJECTING POULTRY IN THE THIGH AND LEG PORTIONS WITHOUT PENETRATING THE SKIN

[75] Inventors: Arnold A. Bladow, Detroit Lakes, Minn.; Francis E. Ramsey, Shell Knob, Mo.

[73] Assignee: Swift and Company, Limited, Chicago, Ill.

[22] Filed: June 24, 1974

[21] Appl. No.: 481,989

[44] Published under the second Trial Voluntary Protest Program on March 23, 1976 as document No. B 481,989.

[52] U.S. Cl. .............................................. 426/281
[51] Int. Cl.$^2$ ........................................ A23L 1/315
[58] Field of Search ................ 426/224, 281, 652; 99/532, 533; 17/42.1; 27/24 R

[56] References Cited

UNITED STATES PATENTS

| 2,162,047 | 6/1939 | Allen | 426/221 X |
|---|---|---|---|
| 3,035,508 | 5/1962 | Nelson | 99/533 |
| 3,119,696 | 1/1964 | Williams | 426/281 |
| 3,511,164 | 5/1970 | Strandine et al. | 99/532 |
| 3,835,223 | 9/1974 | Schwall et al. | 426/281 |

*Primary Examiner*—S. Leon Bashore
*Assistant Examiner*—M. Steve Alvo
*Attorney, Agent, or Firm*—Edward T. McCabe; Charles E. Bouton; W. C. Davis

[57] ABSTRACT

Poultry carcasses are treated to improve the eating qualities, notably flavor, tenderness, juiciness, etc. by injecting an additive such as a liquid into the meat tissue of the leg and thigh portions by inserting a hollow needle through both of the portions from either the end of the leg from which the foot has been severed, or from the posterior opening in the carcass, and without penetrating the skin of the carcass. The needle is inserted into an empty sheath of a tendon which has been pulled from the leg portion, and the needle is advanced through the sheath and beneath the poultry skin through the flesh of the leg without penetrating the skin of the thigh and leg and the additive is then introduced into the flesh.

3 Claims, 3 Drawing Figures

METHOD OF INJECTING POULTRY IN THE THIGH AND LEG PORTIONS WITHOUT PENETRATING THE SKIN

SPECIFICATION

This invention relates to an improved method for benefiting the eating qualities of poultry; and more specifically relates to a method for injecting a treating agent or additive, usually a liquid, into the flesh of the leg and thigh portions of a poultry carcass.

The prior art teaches the injection of various additives into poultry flesh as being beneficial. For example, the Tichy U.S. Pat. No. 2,418,914 teaches various materials to be beneficial when injected into meat or poultry by high pressure spray that passes the material into the flesh apparently without breaking the skin. Earlier the Mareta U.S. Pat. No. 2,128,952 taught that seasoning materials in liquid form could be injected through a hollow needle inserted through the skin into the flesh of poultry. More recently the Nelson U.S. Pat. No. 3,035,508 has taught a multiple needle injecting device for introducing liquid formulas at various points on a poultry carcass; and the Schwall et al U.S. Pat. No. 3,366,491 has taught that fat may be injected into poultry, through needles inserted through the poultry skin, in such a way as to purposely exude therefrom during cooking. Both the Nelson and Schwall et al patents suggest that the leg and thigh portions of the carcass may be benefited by injecting liquid additives with needles inserted through the skin. Additionally, the Allen U.S. Pat. No. 2,162,047 teaches various liquid formulas that are of benefit when injected into meat and poultry and suggests that a poultry thigh may be treated by inserting a needle through the small end of each leg and discharging the liquid adjacent the thigh bone. Finally, the Strandine et al U.S. Pat. No. 3,511,164 teaches that poultry may be benefited by injecting a liquid additive through a hollow needle without penetrating the skin so as to better retain the additive in the breast tissue.

With the exception of the Strandine et al patent the prior art appears to emphasize local application or discharge of an additive into poultry flesh at a number of localized points which may include one or a few points in the leg and thigh area. Most of the prior art requires the additive to be injected through the skin with the result that the additive will tend to be forced outwardly along the injection path and be released through or just under the skin during cooking of the carcass. The Strandine et al patent provides for the administration of a liquid at a large plurality of points internally of the flesh and without penetrating the skin; but it is silent as to how the advantage of this technique, i.e., the retention of the additive within the flesh during cooking, can be extended to the thigh and leg portions. It is believed that the thigh and leg portions may be benefited by a wide distribution of an additive through a plurality of internal points in a manner similar to the Strandine et al technique, devised to retain the additive within the flesh during cooking.

Accordingly, it is a principal object of the present invention to provide an improved method for injecting an additive into the flesh of the leg and thigh portions of a poultry carcass.

It is another object of the present invention to provide an improved method for injecting an additive into the flesh of the leg and thigh portions of a poultry carcass in a manner tending to retain the additive therein during cooking of the carcass.

It is a further object of the present invention to provide an improved method for injecting the leg and thigh portions of a poultry carcass without penetrating the skin of those portions or other parts of the carcass.

Generally, the present invention comprises the positioning of an eviscerated fowl before an operator who grasps and fully extends each leg portion of the carcass so as to substantially align the bones of the leg and thigh at a minimum angle to the back of the carcass, and then inserting a single long multiple orifice needle throughout substantially the length of the fleshy portions of both the leg and the thigh from either the severed end of the leg or from the area around the posterior opening of the carcass and without penetrating the skin of the carcass.

Further objects and advantages will become apparent upon reading the following detailed specification in conjunction with the drawings wherein.

Figure 1:
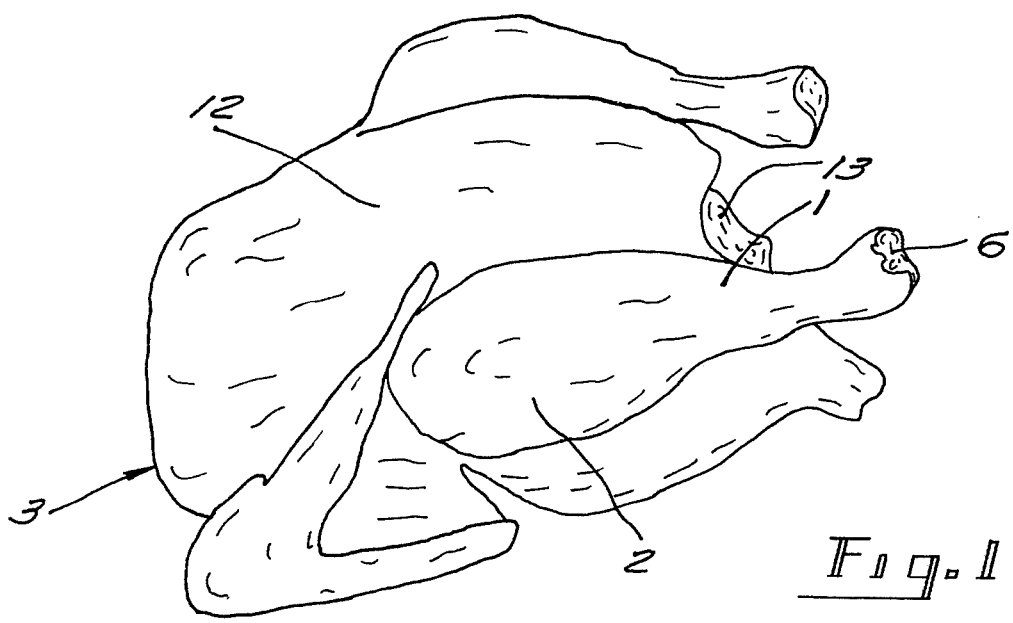
FIG. 1 is a perspective view of an eviscerated poultry carcass prepared for further processing and/or packaging.

The present invention is specifically directed to the injection of an additive material into the leg 1 and thigh 2 flesh of a poultry carcass generally 3 while those portions remain attached to the whole carcass. In practicing the present invention it is essential to extend each leg 1 so as to substantially align the femur 4 and fibula 5 bones of the thigh and leg portions respectively. Accordingly, it is necessary to perform the technique before rigor mortis affects the carcass.

In the usual processing of poultry the birds are slaughtered, defeathered, eviscerated, then chilled and sometimes frozen. Where the carcasses are to be injected with an additive it is preferred that this be undertaken following the chilling operations for a number of reasons. In modern processing plants the chilling of poultry is undertaken rapidly and often involves the tumbling of the carcasses within a body of chilled water. If the poultry carcasses are injected prior to chilling there is the possibility that the additive may be expelled due to the tumbling action. Also, there is the possibility of increasing potential for contaminating the flesh of the poultry through any openings that may have been made therein during the injection operation.

It is also believed that rigor mortis may set in rapidly during processing of the poultry carcasses, and sometimes rigor begins to occur by the time the chilling operation is completed. Accordingly, it is important, in the present invention, to inject the leg 1 and thigh 2 portions promptly after the chilling operation is completed.

Injection of the poultry flesh immediately following chilling is also of advantage where the additive tends to congeal at lower temperatures or contains an agent to promote jelling. Accordingly, it is preferred that the poultry carcass be reduced in temperature to a range of about 40°–65°F. Hence, if the additive is a material such as butter or margarine it will tend to solidify when distributed within the chilled poultry flesh and be retained within the flesh during any subsequent processing.

Figure 2:
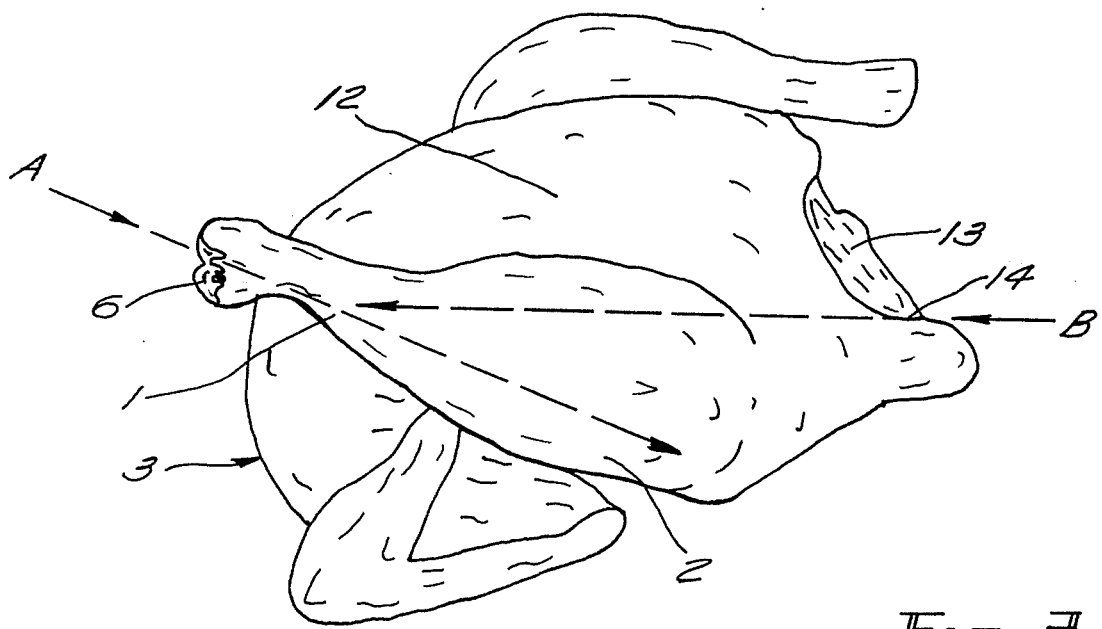
FIG. 2 is a similar view to FIG. 1 but showing one leg and thigh extended preparatory for injection according to the present invention.
Figure 3:
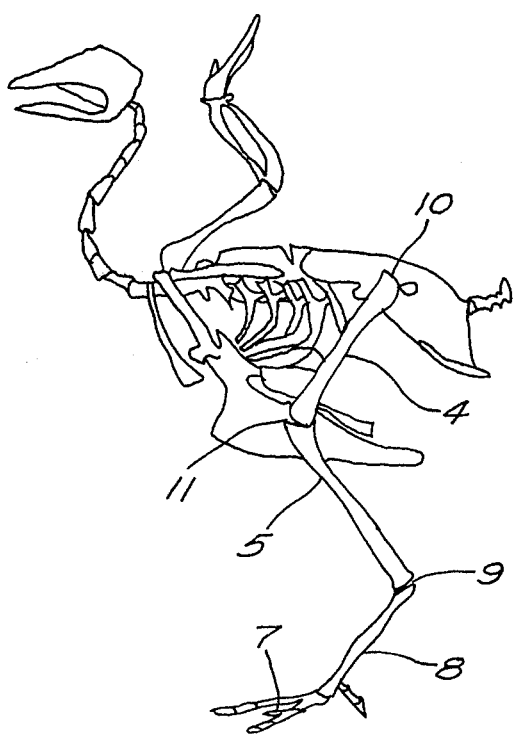
FIG. 3 is a sketch of the skeletal structure of a poultry carcass.

In a preferred embodiment of the present invention, the leg 1 and thigh 2 portions are injected with an additive by introducing a hollow needle, not shown, into the flesh thereof from the extreme end 6 of the leg 1 where the foot has been removed. In this way a hollow needle may be inserted along a path shown generally by arrow A (FIG. 2) between the skin and the bone and advanced substantially parallel to the fibula 5 and femur 4 bones without penetrating the skin or the surface of the flesh. During the normal course of processing a poultry carcass, prior to chilling, the foot 7 and metatarsus 8 are severed from the leg at the joint 9. That operation may be conducted in such a way as to also physically pull and rip several tendons from within the leg structure itself. Preferably, carcasses to be injected according to the presently described embodiment of this invention are processed in that manner. Thus, there will be a number of empty tendon sheaths (not shown) present at the extreme end of the leg.

Thus, an operator first takes a chilled carcass 3 and pulls the leg 1 forwardly so as to extend and align the fibula 5 and femur 4 bones. It is convenient to rest the carcass on its back during this step; and if the legs have been previously trussed or otherwise secured close to the posterior of the bird, they are first loosed and then extended as described. When the legs are extended in this manner they may be held at a minimum angle to the back of the carcass. As previously mentioned, this operation must be undertaken before the bird enters into rigor mortis which will hinder the leg from being thus extended.

The operator then takes a hollow multiple orifice needle, which is connected to suitable valve means and a source of additive under pressure (for illustration, an apparatus and system similar to that disclosed in U.S. Pat. No. 3,511,164, but limited to a single needle may be employed). The needle must be of a length sufficient to extend through the flesh portions of both leg and thigh and it must contain a plurality of orifices along the cylindrical wall of the needle in the areas that will reach and extend through the fleshy portions of both the thigh 2 and leg 1. Preferably, the needle has a closed pointed end to facilitate insertion through the flesh, and to direct all injected additive to discharge through the orifices along the body of the needle and hence in directions substantially lateral to the thigh 2 and leg 1.

Preferably the operator inserts the needle into one of the empty tendon sheaths at the extreme end 6 of the leg 1 and advances the needle gently so that it will tend to follow the sheath for a substantial distance through the leg. The operator should choose an empty sheath along the outer side of the leg away from the body of the carcass as the major portion of the flesh located at the thigh 2 will be on the outer side of the femur 4 bone. The operator then advances the needle substantially through the full length of both the leg 1 and thigh 2 and until the pointed end thereof reaches a point closely adjacent the pelvic joint 10 where the femur 4 bone is attached to the carcass body 3 (ilium bone). All the while the leg is held extended with the fibula 5 and femur 4 bones substantially aligned so that the needle may be extended by the operator, through the leg flesh parallel to the fibula 5 bone, across the joint 11, between the fibula 5 and femur 4 bone, and thence through the thigh flesh substantially parallel to the femur 4, while throughout its course keeping the needle beneath the poultry skin and without ever penetrating same.

When the needle is in the fully inserted position the operator then, by operation of a suitable valve or the like, causes the additive to flow under pressure through the needle and orifices into the flesh of the bird. After a suitable quantity has thus been injected the flow is terminated and the needle withdrawn by a single smooth and rapid motion. Usually both legs 1 and thighs 2 of the bird will be injected in this manner. Other portions of the carcass, such as the breast tissue 12, may also be injected either before or immediately following injection of the legs and thighs by any suitable technique disclosed in the prior art. Thereafter the legs 1 should be folded and tucked closely against the posterior 13 of the bird and trussed so as to remain in that position. The carcass 3 is then ready for further operations such as bagging, freezing, etc., and forwarding to market.

According to a second embodiment of the present invention the thigh 2 and leg 1 portions may be injected by inserting a hollow needle along a path shown generally by arrow B (FIG. 2) from the area of the posterior opening 13 in the poultry carcass 3. This embodiment of the present invention may be chosen where, for one reason or another, the feet have not been removed from the carcass 3 or where the removal of the feet has not included the pulling of tendons from the legs. Other operations to be performed on the carcass 3 may also favor injection of the thigh 2 and leg 1 portions in the following manner. The carcass 3 is first processed and chilled as previously described and the legs 1 are similarly extended so as to substantially align the fibula 5 and femur 4 bones. According to this embodiment it is even more important that the legs be held thus extended as far forwardly as possible and at the most minimum angle to the back of the carcass 3 as may be conveniently achieved by an operator. The needle and injection equipment is similar to that previously described and also shown in the prior art, although as compared to the preferred embodiment the needle should be somewhat longer and there will be a length of about 2 or 3 inches along the barrel of the needle opposite the pointed end that will have no orifices.

While the legs are held extended an operator will carefully insert the needle into the breast flesh 12 of the carcass near the posterior opening 13 and at a point 14 generally in line with the extended femur and fibula bones. The operator will then advance the needle through the flesh and beneath the skin toward the thigh 2 and will continue to advance the needle, while maintaining the point thereof below the skin, across the pelvic joint 10 through the flesh of the thigh 2 thence across the joint 11 between the fibula 5 and femur 4 bones and substantially through the flesh of the leg 1 portion.

When first inserting the needle into the poultry flesh, the technique disclosed in the Strandine et al U.S. Pat. No. 3,511,164 is generally followed. That is, the breast skin is pulled forward from the posterior opening 13 and the needle is first inserted directly into the exposed flesh. However, it is also possible to insert the needle through the body cavity and into the breast flesh in a direction to extend the needle across the pelvic joint and on through the thigh and leg portions. Also, since the additive will be injected through the orifices within the thigh and leg portions it is permissible to insert the needle through the breast skin and thence through a small portion of breast tissue and across the pelvic joint and through the thigh and leg portions as previously described.

When the needle is in the fully extended position the operator operates the equipment, as previously described, to introduce the additive under pressure through the needle and orifices into the poultry flesh. Thereafter, the flow of additive is terminated and the needle similarly withdrawn, and the carcass may then be finished for marketing.

Obviously many modifications and variations of the invention as hereinbefore set forth may be made without departing from the spirit and scope thereof, and, therefore, only such limitations should be imposed as are indicated in the appended claims.

We claim:

1. A method for internally introducing an additive material into at least one of the interconnected thigh and leg portions of a poultry carcass, said method comprising: severing the feet from the poultry leg portions of a poultry carcass and pulling a number of tendons from said leg portions; engaging and fully extending a leg of said carcass before the attainment of rigor mortis, said leg being extended so as to substantially align the femur and fibular bones at a minimum angle to the back of the carcass; inserting a single long multiple orifice needle into an empty tendon sheath from which a tendon has been pulled and advancing said needle through said sheath and beneath the poultry skin substantially parallel to said fibula and through the flesh of said leg, across the joint between said fibula and femur and substantially through the length of the flesh portion of said thigh and substantially parallel to said femur without penetrating the skin of said thigh and leg portions; and introducing an additive under pressure through said needle orifices into the flesh of at least one of said interconnected thigh and leg portions.

2. The method of claim 1 wherein the additive is introduced simultaneously through all of said orifices in lateral directions into the flesh of both the leg and thigh portions.

3. The method of claim 1 wherein the needle is inserted through the leg along the outer side thereof away from the body of said carcass and also inserted through the outer side of said thigh.

* * * * *

UNITED STATES PATENT OFFICE
CERTIFICATE OF CORRECTION

PATENT NO. : 4,008,337
DATED : February 15, 1977
INVENTOR(S) : ARNOLD A. BLADOW and FRANCIS E. RAMSEY It is certified that error appears in the above-identified patent and that said Letters Patent are hereby corrected as shown below:

The patent should show on its face that it is assigned to Swift & Company of Chicago, Illinois.

Signed and Sealed this twenty-third Day of August 1977

[SEAL]

Attest:

RUTH C. MASON
Attesting Officer

C. MARSHALL DANN
Commissioner of Patents and Trademarks